United States Patent [19]

Wang et al.

[11] Patent Number: 5,525,375
[45] Date of Patent: Jun. 11, 1996

[54] PROCESS FOR PRODUCING HOT MELT RELEASE COATING

[75] Inventors: Eric I. Wang, Youngstown, N.Y.; Donatas Satas, Warwick, R.I.

[73] Assignee: Moore Business Forms, Inc., Grand Island, N.Y.

[21] Appl. No.: 462,028

[22] Filed: Jun. 5, 1995

[51] Int. Cl.⁶ ............... B05D 5/08; B05D 5/04; B05D 3/02
[52] U.S. Cl. ............ 427/391; 427/385.5; 427/398.1
[58] Field of Search ................. 427/314, 316, 427/365.5, 391, 398.1, 228.4

[56] References Cited

U.S. PATENT DOCUMENTS

| | | | |
|---|---|---|---|
| 2,532,011 | 11/1950 | Dahlquist et al. | 525/61 |
| 3,658,574 | 4/1972 | Izzi et al. | 428/226 |
| 3,851,761 | 12/1974 | Schwarcz | 428/352 |
| 3,970,599 | 7/1976 | Schwarcz | 528/68 |
| 4,035,218 | 7/1977 | Yount | 427/208.4 |
| 4,177,812 | 12/1979 | Brown et al. | 604/392 |
| 4,398,985 | 8/1983 | Eagon | 428/212 |
| 4,582,736 | 4/1986 | Duncan | 428/40 |
| 4,599,260 | 7/1986 | Truskolaski et al. | 428/207 |
| 4,612,052 | 9/1986 | Schwartz | 428/352 |
| 4,626,460 | 12/1986 | Duncan | 428/40 |
| 4,664,416 | 5/1987 | Steidinger | 462/2 |
| 4,704,163 | 11/1987 | Baratto et al. | 428/343 |
| 4,839,123 | 7/1989 | Duncan | 264/22 |
| 4,933,124 | 6/1990 | Duncan | 264/22 |
| 5,106,383 | 4/1992 | Mulder et al. | 604/390 |
| 5,154,962 | 10/1992 | Mertens et al. | 525/100 |
| 5,234,522 | 8/1993 | Suzuki et al. | 428/202 |

*Primary Examiner*—Peter A. Szekely
*Attorney, Agent, or Firm*—Finnegan, Henderson, Farabow, Garrett & Dunner

[57] ABSTRACT

A hot melt process for producing a release coating. The process involves first forming a mixture of a release agent and a thermoplastic polymer in the absence of a solvent. The release agent is not completely compatible with the thermoplastic polymer. The mixture has a softening temperature ranging from about 120° to about 350° F. The mixture is heated to a temperature at or above its softening temperature and then coated onto at least a portion of a substrate. The coated substrate is cooled for a time and at a temperature sufficient to cause the mixture to solidify.

17 Claims, No Drawings

PROCESS FOR PRODUCING HOT MELT RELEASE COATING

BACKGROUND OF THE INVENTION

1. Field of the Invention

This invention relates to hot melt release coatings and, in particular, to hot melt processes for producing release coatings for linerless and linered labels.

2. Description of Related Art

Pressure sensitive adhesive labels conventionally include a pressure sensitive adhesive (PSA) material coated onto a substrate with a release layer affixed thereto. The release layer may be coated onto another substrate, a liner, which is then affixed to the adhesive substrate. Such labels, called linered labels, are used by simply peeling away the release liner and pressing the adhesive coated side of the substrate to the desired surface. The liner acts as a support for transport, printing and storage, and is discarded after the substrate coated with the PSA is removed from the liner. In contrast, a linerless label has a face surface that is coated with a release coating and a back surface that is coated with a PSA. A strip of linerless labels may be wound in a roll configuration so that the PSA on the back side of the strip is in contact with the release coating on the face side of the strip, where the release coating faces outwardly. The adhesion between the PSA and release coating holds the strip in a roll. Labels made in this way can be peeled off individually from the roll of linerless labels, without having a liner web to tear off and discard each time a label is used.

Various release coatings have been proposed for use with linerless and linered labels. A desired release material is one that is receptive to printing and also has good release properties. It has been found, however, that while certain release compositions provide adequate release properties for pressure sensitive adhesives, they are either not receptive to printing or the printing is removed from the release when the PSA is removed from its liner or from a roll.

Moreover, many release compositions include potentially flammable and toxic solvents, which create problems in use. Solvents need to be removed by drying, which is not only an additional costly step in the process, but also causes removal of moisture from paper, resulting in undesirable wrinkling or curling. Such wrinkling or curling, in linered labels, can cause the release coating to become detached from the PSA layer. Also, when solvents are removed from the release composition, the coated substrate can take on a cloudy or dirty appearance, which is undesirable, particularly for linerless labels in which the release stays with the label and is not discarded.

Thus, there is a need for a release coating that provides adequate release properties for pressure sensitive adhesives, and also allows ink to adhere to the release surface.

There is also a need for a release coating that does not contain solvents and thus can be applied without a drying step.

There is also a need for a release coating that provides a high gloss finish.

There is a further need for a release coating that provides good barrier properties.

There is a further need for a release that can be spot coated onto a portion of a substrate.

The present invention satisfies these and other needs by providing a release coating applied by a hot melt process that does not require solvents or a drying step, has a high gloss finish, can be easily spot coated, and provides good barrier properties.

It is to be understood that both the foregoing general description and the following detailed description are exemplary and explanatory and are intended to provide further explanation of the invention as claimed.

SUMMARY OF THE INVENTION

To achieve these and other advantages, and in accordance with the purpose of the invention as embodied and broadly described herein, the present invention provides a hot melt process for producing a release coating. The process involves first forming a mixture of a release agent and a thermoplastic polymer in the absence of a solvent. The release agent is not completely compatible with the thermoplastic polymer. The mixture has a softening temperature ranging from about 120° to about 350° F. The mixture is heated to a temperature at or above its softening temperature and then coated onto at least a portion of a substrate. The coated substrate is cooled for a time and at a temperature sufficient to cause the mixture to solidify.

Although the preferred embodiment of the process of the invention is for producing release coatings for labels, the invention as broadly claimed is not so limited and its benefits and advantages apply equally to other applications requiring release materials. The above and other advantages and features of this invention will become apparent upon review of the following written description.

DETAILED DESCRIPTION OF THE PREFERRED EMBODIMENTS

In accordance with the present invention, as embodied and broadly described herein, a hot melt process is provided for producing a release coating. The process involves forming a mixture of a thermoplastic polymer and a release agent. Various release agents known in the art are described in "Handbook of Pressure Sensitive Adhesive Technology," D. Satas, editor, Van Nostrand Reinhold, New York, N.Y., 1989, pp. 585–600. The release agent of the invention should be a material that is not totally compatible with the thermoplastic polymer so the release agent can migrate to the surface of the mixture to provide the appropriate release properties.

Examples of release agents usable in the invention include carbamates, silicones and fluorocarbons. Preferred release agents are carbamates having relatively high softening points. Carbamates having long side chains have relatively high softening points and thus are particularly suitable in the present invention. A particularly preferred release agent for use in the invention is polyvinyl octadecyl carbamate, available from Anderson Development Co. of Adrian, Mich., marketed as ESCOAT P20, and from Mayzo Inc. of Norcross, Ga., marketed in various grades as RA-95H, RA-95HS, RA-155 and RA-585S. The present inventors have determined by DSC using a TA Instruments Thermal Analyst 2100 that the softening temperatures for these various grades of polyvinyl octadecyl carbamate (PVODC) are:

| | Softening Temperature, °F. | |
|---|---|---|
| PVODC Grade | Start | End |
| Escoat P20 | 131.2 | 230 |
| Escoat P20 (purified) | 125.1 | 250.7 |

-continued

| PVODC Grade | Softening Temperature, °F. | |
|---|---|---|
| | Start | End |
| RA-95H | 124.3 | 226.4 |
| RA-95HS | 127.0 | 248 |
| RA-155 | 132.8 | 240.8 |
| RA-585S | 181.9 | 242.6 |

Thermoplastic polymers that can be used in the invention include those thermoplastic polymers that have softening points that allow them to be coated onto a substrate as a hot melt. Such thermoplastic polymers could be, for example, random copolymers such as ethylene vinyl acetate copolymers, other ethylene copolymers, or polyethylene, polyamides, polyesters, polyurethanes, atactic polyolefins, waxes, and the like. Extrudable thermoplastic random or block copolymers having viscosities higher than those of hot melts could also be used in the invention, such as, for example, styrene butadiene rubber, nitrile rubber, polyisoprene, butyl rubber, and the like. A preferred thermoplastic polymer for use in the invention is ethylene vinyl acetate copolymer, available from E. I. DuPont de Nemours & Co., Wilmington, Del., sold in various grades under, for example, the trade names ELVAX 240W, ELVAX 250, ELVAX 260 and ELVAX 4320. Other manufacturers of EVA include Ashland Chemical, Chevron Chemical, EniChem America, Exxon, Union Carbide and Quantum Chemical. The present inventors have determined by Differential Scanning Calorimetry (DSC) using a TA Instruments Thermal Analyst 2100 that the softening temperatures for these various grades of ethylene vinyl acetate copolymer (EVA) are:

| EVA Grade | Softening Temperature, °F. | |
|---|---|---|
| | Start | End |
| Elvax 40W | 41.7 | 163.2 |
| Elvax 210 | 59.4 | 181.8 |
| Elvax 150W | 90.5 | 179.1 |
| Elvax 240W | 132.1 | 203 |
| Elvax 250 | 132.8 | 203 |
| Elvax 260 | 123.8 | 204.8 |
| Elvax 4320 | 133.7 | 198.5 |

In accordance with the invention, for those grades of EVA having starting softening temperatures below 120° F., it has been found necessary to crystallize EVA using appropriate solvents. This crystallization process may be carried out by mixing the EVA with an appropriate solvent or a mixture of solvents, such as toluene and/or benzene, at room temperature or at an elevated temperature depending upon the vinyl acetate content and the time allowed to process, and then crystallizing at low temperatures followed by filtration or centrifuging. An additional and preferred method to obtain starting softening temperatures of at least about 120° F. is to adjust the vinyl acetate content or the molecular weight distribution of the polymer by adjusting the weight ratios of the monomers making up the EVA or adjusting the amount of chain transfer agent, such as propylene or isobutylene.

In accordance with the invention, the thermoplastic polymer is mixed with the release agent in the absence of a solvent to form a mixture having a softening temperature ranging from about 120° F. to about 350° F. Mixtures having softening temperatures within this range can be applied to a substrate as a hot melt by heating the mixture to a temperature above its softening temperature, coating the resulting hot melt mixture onto at least a portion of the substrate, and cooling the coated substrate for a time and temperature sufficient to cause the mixture to solidify. Because the mixture of the invention does not contain a solvent, a separate drying step is not required, which can create problems with thermoplastic films and can cause paper to undesirably wrinkle or curl.

In accordance with the invention, the mixture of thermoplastic polymer and release agent is preferably heated to a temperature between about 150° F. and 350° F., more preferably between about 250° F. and 350° F., prior to application to the substrate.

Mixtures having a softening temperature between about 120° F. and about 350° F. can be applied to the desired substrate after they are heated to or above their softening temperature by conventional techniques, such as, for example, roll or knife coating, or screen or extrusion coating. The mixture is preferably applied to the substrate in a coating weight ranging from about 0.5 to about 10 lbs./ream. The present inventors have found that mixtures having softening temperatures below about 120° F. or above about 350° F. cannot be applied properly to the substrate because, for example, the mixture sticks to the applicator or the formulation is overheated and degraded.

The relative proportion of thermoplastic polymer and release agent in the process of the invention is not limited. A preferred ratio in accordance with the invention, however, is for the release agent to comprise about 20 to about 50%, by weight, of the total mixture of thermoplastic polymer and release agent, more preferably about 25 to about 45% by weight.

The release coating produced by the process of the invention can also contain other conventional additives for release materials, such as, for example, antioxidants, fillers, rheology modifiers, and the like, all of which are known in the art.

The hot melt process of the invention can create a release coating that has excellent release and ink adhesion properties so that the release can be printed on without the ink being removed by contact with the adhesive.

The process also provides a high gloss finish so that the release does not have a cloudy or dirty appearance. High gloss finishes are highly desirable in labels because such a finish looks more polished and is more aesthetically appealing. In processes wherein the release is applied in a solvent system, after the solvents are evaporated or dried, the film often takes on a cloudy appearance.

Further, because the release mixture is applied in a molten state, the substrate can be coated with a relatively homogenous coating over the entire surface to be coated, which provides good barrier properties so that a separate barrier or tie layer may not be needed between the substrate and the release layer.

In addition, the process enables the release to be spot or strip coated onto only a portion of a substrate, if desired. The process of the invention is particularly advantageous for use in producing spot coated release coatings for labels incorporating repositionable adhesives.

EXAMPLES

The following typical examples illustrate the invention, but are not intended to limit the scope thereof. In the examples, all parts are by weight unless otherwise indicated. Hot melt release coatings according to the invention can be prepared using a hot melt coater or hot melt extruder (both available from Accumeter Division of May Coating Technology, Inc. of White Bear Lake, Minn.). The hot melt composition is applied to a paper substrate through a preset gap of two electrically heated rollers. The gap is typically set at one to two millimeters in excess of the thickness of the paper. The temperature of both rollers is suitably maintained at between 280° F. and 300° F.

Example 1

One hundred parts of the ethylene vinyl acetate copolymer Elvax 210, which has been subjected to solvent crystallization as described herein to raise the starting softening temperature above 120° F., is mixed and heated with 40 parts of the polyvinyl octadecyl carbamate Mayzo 95 H to provide a hot melt coating composition. The composition is applied to a paper substrate in an amount of 5 pounds/ream (ream size of 1300 square feet), and permitted to cool. The release coating has a high gloss finish and good barrier properties, firm adherence to the paper substrate, and provides excellent delamination characteristics for pressure sensitive adhesives.

Example 2

One hundred parts of the ethylene vinyl acetate copolymer Elvax 210, which has been subjected to solvent crystallization as described herein to raise the starting softening temperature above 120° F., is mixed and heated with 40 parts of the polyvinyl octadecyl carbamate Mayzo RA 155 to provide a hot melt coating composition. The hot melt composition is applied to a paper substrate in an amount of 6 pounds/ream (ream is size 1300 square feet), and permitted to cool. This release coating also provides a high gloss finish with good barrier properties. The coating both firmly adheres to the paper substrate and is easily separated from a pressure sensitive adhesive layer.

Example 3

One hundred parts of the ethylene vinyl acetate copolymer Elvax 240 W is mixed and heated with 40 parts of the polyvinyl octadecyl carbamate Mayzo RA-5855 to provide a hot melt coating composition. The composition is applied to a paper substrate in an amount of 5 pounds/ream (ream size 1300 square feet) and permitted to cool. The release coating has a high gloss finish and good barrier properties. The coated paper is free of wrinkling and curling and provides a surface that is particularly well suited as a release surface for pressure sensitive adhesives.

It will be apparent to those skilled in the art that various modifications and variations can be made in the process of the invention without departing from the spirit or scope of the invention. Thus, it is intended that the present invention cover the modifications and variations of this invention provided that they come within the scope of the appended claims and their equivalents.

What is claimed is:

1. A hot melt process for producing a release coating, comprising:
    forming a mixture of a thermoplastic polymer and a release agent not completely compatible with the thermoplastic polymer, in the absence of a solvent, said mixture having a softening temperature ranging from about 120° F. to about 350° F.;
    heating said mixture to a temperature ranging from about 120 degree F. to about 350 degree F., which temperature is at or above its softening temperature;
    coating said softened mixture onto at least a portion of a substrate; and
    cooling said coated substrate for a time and at a temperature sufficient to cause said mixture to solidify.

2. The process of claim 1, wherein said mixture is heated to a temperature ranging from about 150° F. to about 350° F.

3. The process of claim 2, wherein said softening temperature ranges from about 120° F. to about 250° F.

4. The process of claim 3, wherein said mixture is heated to a temperature ranging from about 250° F. to about 300° F.

5. The process of claim 1, wherein said mixture is applied to said substrate without a drying step.

6. The process of claim 1, wherein said thermoplastic polymer is an ethylene vinyl acetate copolymer, ethylene copolymer, polyethylene, polyamide, polyester, polyurethane, atactic polyolefin, styrene butadiene rubber, nitrile rubber, polyisoprene or butyl rubber.

7. The process of claim 6, wherein said thermoplastic polymer is an ethylene vinyl acetate copolymer.

8. The process of claim 1, wherein said release agent is a carbamate, silicone or fluorocarbon.

9. The process of claim 8, wherein said release agent is a carbamate.

10. The process of claim 9, wherein said release agent is polyvinyl octadecyl carbamate.

11. The process of claim 1, wherein said release agent comprises about 20 to about 50% by weight of said mixture of release agent and thermoplastic polymer.

12. The process of claim 11, wherein said release agent comprises about 25 to about 45% by weight of said mixture of release agent and thermoplastic polymer.

13. The process of claim 1, wherein said mixture is applied to said substrate in a coating weight ranging from about 0.5 to about 10 lbs./ream.

14. The process of claim 13, wherein said mixture is applied to said substrate in a coating weight ranging from about 5 to about 6 lbs./ream.

15. The process of claim 1, wherein said mixture is applied onto a tie coating on said substrate.

16. The process of claim 1, wherein said substrate is paper.

17. The process of claim 16, wherein said substrate is a label.

* * * * *